(12) United States Patent
Seitner

(10) Patent No.: US 10,487,517 B2
(45) Date of Patent: Nov. 26, 2019

(54) INSULATING UNDERLAY ELEMENTS FOR PARQUET AND LAMINATE FLOORING, HAVING LATERAL PUSH-IN CONNECTIONS AND ADHESIVE STRIPS

(71) Applicant: Selit NA-Holding GmbH, Erbes-Büdesheim (DE)

(72) Inventor: Marco Seitner, Erbes-Büdesheim (DE)

(73) Assignee: SELIT NA-HOLDING GMBH, Erbas-Büdesheim (DE)

( * ) Notice: Subject to any disclaimer, the term of this patent is extended or adjusted under 35 U.S.C. 154(b) by 130 days.

(21) Appl. No.: 15/452,463

(22) Filed: Mar. 7, 2017

(65) Prior Publication Data

US 2017/0260756 A1    Sep. 14, 2017

(30) Foreign Application Priority Data

Mar. 8, 2016 (DE) .................... 20 2016 101 245 U

(51) Int. Cl.
| | |
|---|---|
| B32B 3/10 | (2006.01) |
| E04F 15/18 | (2006.01) |
| E04F 15/20 | (2006.01) |
| B32B 7/12 | (2006.01) |
| B32B 37/10 | (2006.01) |
| B32B 37/12 | (2006.01) |

(Continued)

(52) U.S. Cl.
CPC .............. *E04F 15/182* (2013.01); *B32B 7/12* (2013.01); *B32B 37/10* (2013.01); *B32B 37/12* (2013.01); *B32B 37/14* (2013.01); *B32B 38/04* (2013.01); *E04F 15/203* (2013.01); *B32B 2307/304* (2013.01); *B32B 2309/105* (2013.01); *B32B 2471/00* (2013.01); *E04F 2201/07* (2013.01); *E04F 2201/091* (2013.01); *E04F 2201/095* (2013.01)

(58) Field of Classification Search
None
See application file for complete search history.

(56) References Cited

U.S. PATENT DOCUMENTS 3,657,852 A * 4/1972 Worthington ........... E04F 15/02
52/392
4,018,025 A * 4/1977 Collette ................ E01C 13/107
404/41

(Continued)

*Primary Examiner* — Christopher M Polley
(74) *Attorney, Agent, or Firm* — Hauptman Ham, LLP

(57) ABSTRACT

An insulating underlay element for arranging between a subfloor and floor coverings laid thereon. The underlay element comprises a push-in connection on at least two sides of the insulating underlay element for connecting the insulating underlay elements to form an extensive insulating underlay in a gap-free and extensive manner, wherein an adhesive strip is arranged on the underside of the insulating underlay element in the region of the push-in connection, such that the adhesive surface is facing upward in the receptacles of the push-in connections and is in contact with the undersides of the pushed-in protrusions. The adhesive strip comprises a backing material coated with a release adhesive, and the insulating underlay elements being coated on their underside with a permanent adhesive in the region of the arrangement of the adhesive strips to establish a permanent adhesive connection between the adhesive strips and the underside of the insulating underlay element.

11 Claims, 2 Drawing Sheets

Figure 1:
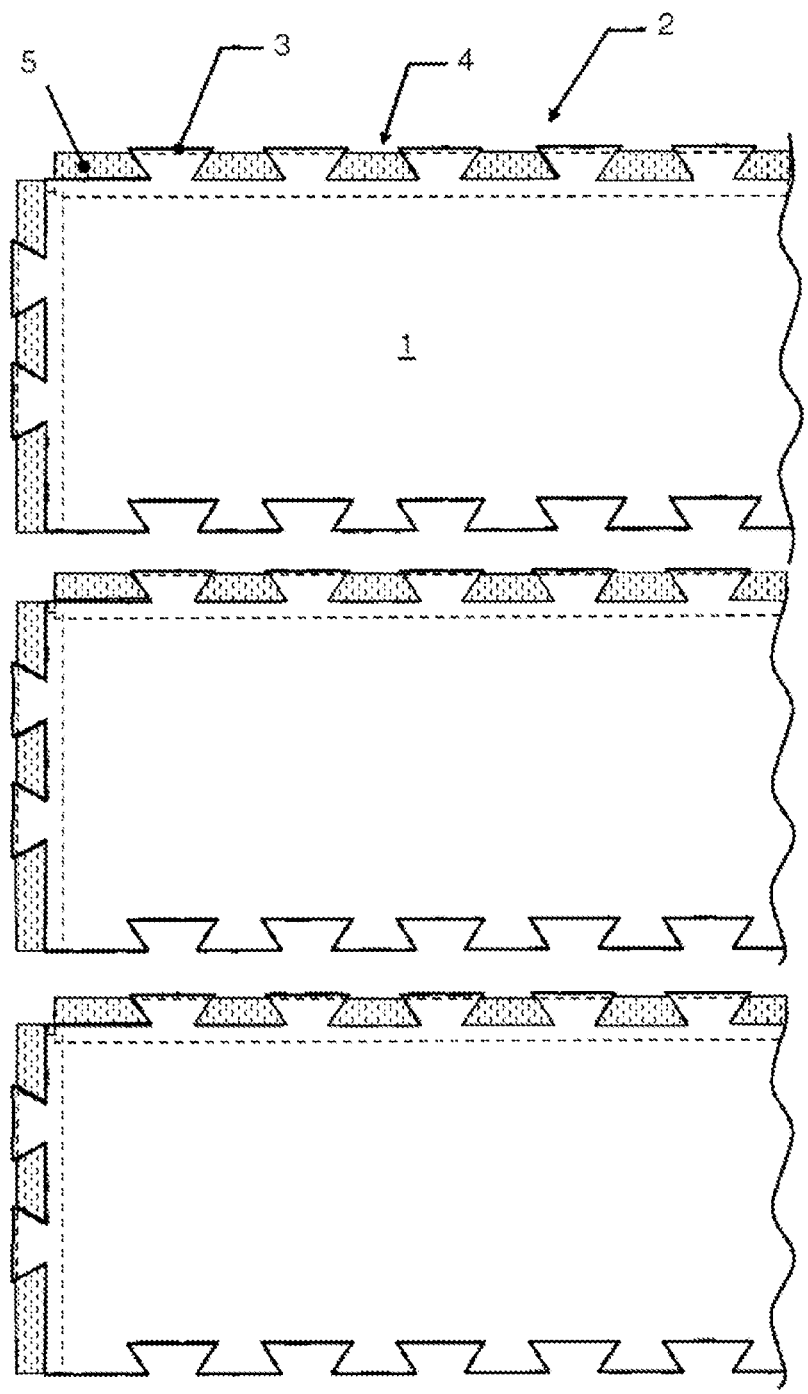

(51) Int. Cl.
*B32B 37/14* (2006.01)
*B32B 38/04* (2006.01)

(56) References Cited

U.S. PATENT DOCUMENTS

| | | | | |
|---|---|---|---|---|
| 5,775,046 A | * | 7/1998 | Fanger | A47B 81/06 |
| | | | | 108/157.16 |
| 5,791,114 A | * | 8/1998 | Mandel | E01C 5/20 |
| | | | | 52/591.3 |
| 8,356,447 B2 | * | 1/2013 | Lach | A47G 27/0293 |
| | | | | 52/177 |
| 8,806,831 B1 | * | 8/2014 | Dreyer | E04F 15/02038 |
| | | | | 52/177 |
| 9,771,722 B2 | * | 9/2017 | Hurson | E04F 15/02038 |
| 2003/0131549 A1 | * | 7/2003 | Kappeli | B29C 45/14811 |
| | | | | 52/390 |

* cited by examiner

INSULATING UNDERLAY ELEMENTS FOR PARQUET AND LAMINATE FLOORING, HAVING LATERAL PUSH-IN CONNECTIONS AND ADHESIVE STRIPS

The invention relates to insulating underlay elements for arranging between a subfloor and walkable floor coverings laid thereon, according to the preamble of claim 1.

It is known practice to arrange such insulating underlays made up of individual elements as an intermediate layer between a subfloor, usually a screed, and the walkable floor covering arranged thereabove, for example a laminate flooring, in order to reduce noise when walking on the floor covering in the room, in particular for rooms located below and adjacent thereto, and additionally to cushion the floor covering and thus increase walking comfort.

When the insulating underlay elements are fitted, they are arranged on the subfloor. In the process, the insulating underlay can be unrolled from a reel having a width of, for example, 100 cm and cut to the length of a room. In the process, a plurality of insulating underlay webs are arranged alongside one another in order to cover the floor surface.

Furthermore, insulating underlay panels are available, which are laid for example in the format of 80 by 60 cm, and also folding panels, which are unfolded to form a long insulating underlay web, for example in the format of 120 cm in width and about 8 to 15 meters in length with folding at a spacing of about 25 cm in each case.

In order for the insulating underlay to be laid in a reliable and extensive manner, it is known from the prior art to arrange push-in connections at the edges of the insulating underlay elements, in particular in the case of panels and folding panels.

An insulating underlay for parquet and laminate flooring is already known from the document DE 20 2005 017 040 and has laterally arranged push-in connection means which effect a form-fitting connection of the individual insulating underlay elements to one another. In this way, it is basically possible to allow the reliable connection between the individual insulating underlay elements both in the case of rolled webs and those in panel form.

However, it has been found in practice that such a design is not sufficient on its own to secure the push-in connection against unintentionally disengaging, in particular when the insulating underlays used have only a small thickness or, in the case of rolled material, exhibit bowing stress, which acts counter to the lying flat of the insulating underlays on the subfloor.

Thus, it has been shown that, for example in the case of covering thicknesses of 5 mm and less, the insulating underlay elements connected with the push-in connection means can disengage again, in particular when they do not lie completely flat on the floor on account of bowing stress on account of their presentation in the form of a roll or in folded webs. As a result, the push-in connection can disengage and the insulating underlay elements already arranged on the floor can move, thereby slowing down the work.

Here, too, specific solutions have been proposed in the prior art, which are intended to improve the adhesion of the push-in connections in the case of thin insulating underlays.

Thus, the laid-open specification DE 20 2009 017 368 U1 discloses an insulating underlay for arranging between a subfloor and walkable floor coverings laid thereon, comprising a push-in connection on at least two sides of the insulating underlay elements, wherein the push-in connections have a profiled surface at least on one side at their abutting edges that engage in one another. As a result of this contour of the abutting edges, this results in better adhesion of the surfaces of the abutting edges to one another, thereby improving the firmness of the push-in connection.

However, it has been shown that these profiled surfaces alone still cannot reliably prevent disengagement of the push-in connections when the insulating underlays are laid, in particular in the case of thin insulating underlays which at the same time exhibit bowing stress on account of the packing unit in the form of rolled material, with the result that the insulating underlays can undesirably move relative to one another.

Against this background, the object of the present invention is to create insulating underlay elements for arranging between a subfloor and walkable floor coverings laid thereon, comprising a push-in connection on at least two sides of the insulating underlay elements for connecting the insulating underlay elements to form an extensive insulating underlay in a gap-free and extensive manner, allowing a reliable connection of the individual insulating underlay elements even when these elements have only small thicknesses. What is intended to be achieved hereby is that, as a result of the solution according to the invention, the known push-in connections reliably connect the edges even of insulating underlays which exhibit bowing stress on account of a packing unit for example in the form of rolled material or on account of bowing stress introduced into the insulating underlays by a laminated film.

This is achieved according to the invention by an insulating underlay having the features of claim 1.

The dependent claims relate to advantageous configurations of the invention.

The inventive basic concept of the invention is thus to improve the connection of the push-in connection such that a supporting adhesive connection of the protrusions, inserted into the receptacles, of the push-in connections occurs. For this purpose, provision is made for an adhesive strip to be arranged on the rear side or underside of the insulating underlays such that it is arranged with its adhesive surface in the receptacles of the push-in connections facing upward.

This has the result that the push-in connection protrusions inserted into the receptacles come to rest with their undersides on the adhesive surface of these adhesive strips, resulting in an adhesive connection which prevents the push-in connection protrusions coming out of the receptacles. At least, this is intended not to occur unintentionally.

This leads to a further aspect of the invention, specifically the consideration that the adhesive strip used is intended to allow the push-in connection to disengage again if a correction is intended to be made here for example when laying the insulating underlay. Therefore, the adhesive used for the adhesive strip are what are known as a release adhesive for example based on acrylate or rubber, which is characterized in that the connection of the push-in connection protrusions in the receptacles of the push-in connection is configured to be disengageable.

The adhesion is to this end selected such that unintentional detachment of the engaging protrusions from the push-in connection receptacles does not occur, but at the same time, given corresponding lifting of the protrusions out of the push-in connections, these can also be disengaged or removed again from the surfaces of the adhesive strips. Thus, the disengageability of the insulating underlay elements from one another remains ensured.

In an expedient development of the invention, provision is made for the adhesive strips to be arranged continuously on the rear side of the insulating underlay elements, wherein, in this case, the application of these adhesive strips already takes place in an automated and continuous manner during the production of the insulating underlays. As a result, simplified production of these insulating underlays with the rear-side adhesive strips is possible, since, even in continuous production, in particular for the pack in the form of rolled material, only one continuous adhesive strip needs to be placed on the rear side, which remains with its adhesive surface free only in the region of the receptacles of the push-in connections and is bonded to the actual insulating material in the regions of the protrusions and on the rear side of the insulating underlays.

The adhesive strip is formed from a backing material, to which the release adhesive is applied on one side, such that a smooth face of the adhesive strip exists on the underside facing the subfloor, for example on account of siliconization, and the top side, oriented upward toward the overlying floor, of the adhesive strip bears the release adhesive and is, for the one part, adhesively bonded to the underside of the insulating underlay element and the protrusions, arranged at the periphery thereof, of the push-in connection and, for the other part, extends as a free adhesive surface in the receptacles of the lateral push-in connection. This establishes the disengageable connection to the bottom surface of the protrusions, engaging in these receptacles, of the push-in connection of an adjacent insulating underlay element when the push-in connection is assembled.

The insulating underlay elements are, according to the invention, additionally coated at least partially on their undersides with a permanent adhesive in the region of the arrangement of the adhesive strips, in order to effect a permanent adhesive bond between the adhesive strips and the underside of the insulating underlay element. The background of this configuration according to the invention is that of securing the adhesive strip against unintentional disengagement. Precisely in the case of multiple connection and disengagement of the release adhesive in the receptacles of the push-in connection with protrusions engaging therein during the laying of the insulating underlay elements, it is otherwise possible for the adhesive strip to lift off, making it harder to handle the insulating underlay elements. Therefore, the permanent adhesive bonding is carried out in addition to the release adhesive bonding in the regions of the connection to the underside of the insulating underlay elements.

In an expedient embodiment of the invention, this adhesive bonding takes place by way of one or more applications of adhesive applied in the form of strips laterally with respect to the receptacles of the push-in connection.

Finally, a relevant technical component for the present solution is that the receptacles of the push-in connections are dimensioned such that the adhesive strips extending behind these receptacles have sufficient tension to avoid sticking firmly together depending on the type of packing unit. It would be problematic in particular in the case of folding panels if the opposing cutouts with the adhesive strips arranged therebehind were to result in these adhesive strips touching one another with their opposing adhesive surfaces and sticking together so as to greatly prevent the adhesive panels from being folded open or to damage the adhesive strips.

As a result of dimensioning of the receptacles that is selected depending on the backing material used for the adhesive strip, in relation to the internal stress of the adhesive strips, this does not result in the adhesive strip in the receptacles sagging, as could easily occur with receptacles dimensioned to be too large, for example when the folding panels are pressed together in the pack. In other words, this solution makes it necessary to configure the receptacles to be narrow enough for the adhesive strips in the receptacles to have sufficient tension.

An example of a structural variant of the invention is an insulating underlay element in the form of a folding panel that is made of foamed plastic with a thickness of 1-2 mm (suitable under vinyl floors), at the two longitudinal edges of which a push-in connection formed from alternately arranged receptacles and protrusions extends. Suitable plastics to be used are for example those based on polystyrene foam (EPS, XPS), polyethylene foam (PE, XLPE), polypropylene foam (PP, XLPP) and polyester foams (PET). In principle, the design as an individual panel and as rolled material having these and the following features is also provided here.

A continuous adhesive strip is arranged behind the push-in connection only at one of these push-in connection longitudinal edges, said adhesive strip reaching as far as the outer edge of the push-in connection with its first, outer longitudinal edge and extending over the depth of the receptacles onto the underlying face of the insulating underlay element with its second, inner longitudinal edge. This means that a first part of the adhesive strip extends on the underside as a continuously flat strip on the underlying face of the insulating underlay element, a second part extends in an extensive manner under the protrusions of the push-in connection and a third part extends with the surface of the adhesive strip exposed in the receptacles of the push-in connection.

Said first part of the adhesive strip is adhesively bonded to the underside of the insulating underlay element by means of a permanent adhesive applied in strips, wherein three parallel strips of a hotmelt adhesive based on rubber are arranged. In this way, a total coating weight of the adhesive of approximately 0.5 grams per meter is applied.

A PET liner with a thickness of about 23µ and a width of about 25 mm is used as adhesive strip. The latter is siliconized on its smooth rear side and bears a release adhesive coating of about 35 grams per $m^2$. It is technically advantageous here for the PET liner to have high tear resistance. This ensures that the adhesive strip is capable of compressing the insulating material without tearing it in the region of the fold in the case of folding panels. At the same time, it has a tension which prevents adhesive bonding of opposing adhesive portions of the adhesive strip when the folding panel is packed.

The push-in connection is in this case formed from an alternate sequence of protrusions and receptacles, which have an approximate width of 3 cm, wherein the depth of the receptacles is about 1.5 cm. It has been demonstrated here that, as a result of this dimensioning, undesired sticking of opposing portions of the adhesive strips in the receptacles can be avoided in combination with adhesive strips which have a backing material approximately as described above.

An advantageous aspect of the invention is also that the production of the insulating underlay elements can take place continuously, wherein, after the insulating underlay elements have been produced, the push-in connections are punched out and subsequently the adhesive strip is applied. This can take place such that first of all the permanent adhesive is applied in strips to the underside of the insulating underlay elements beneath the receptacles by means of a hotmelt adhesive application head. Then, the adhesive strip is unrolled from a reel, positioned parallel to the longitudinal edge of the push-in connection and fastened in the region of the push-in connection by means of a pressure roller.

It is expedient here to apply the permanent adhesive in a plurality of parallel strips, resulting in extensive adhesive bonding with a low coating weight.

Figure 2:
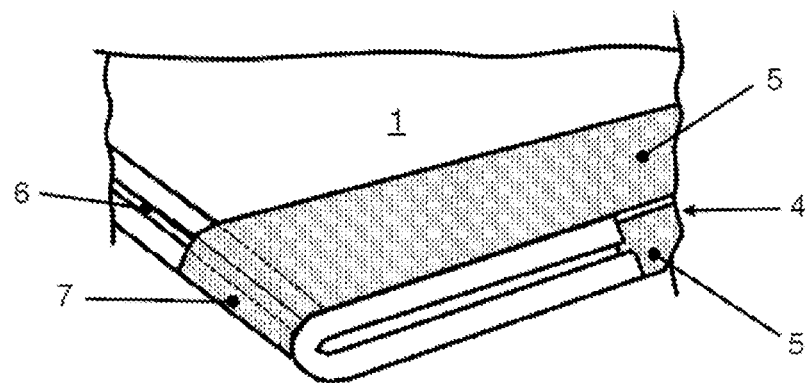
Figure 3:
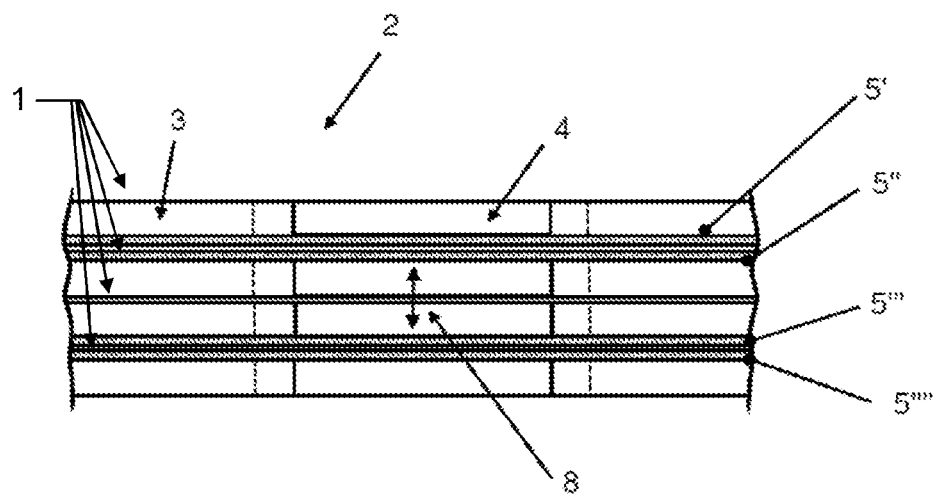

The invention is intended to be described in more detail in the following text with reference to figures, in which FIG. 1 shows a plan view of insulating underlay elements 1 arranged alongside one another with laterally encircling push-in connections 2, FIG. 2 shows the bending portion of a folding panel in the region of the adhesive strip 5, and FIG. 3 shows a side view of insulating underlays 1, packed in a folded manner, with adhesive strips 5 and a view into the receptacles 4.

The plan view of the insulating underlays 1 arranged alongside one another is in this case intended to clarify merely schematically how the connection is intended to take place through the arrangement of the adhesive strips 5 in the region of the push-in connections 2. A solution is disclosed here in which push-in connections 2 in the form of protrusions 3, which engage in corresponding receptacles 4 located opposite, are arranged on a longitudinal side and a transverse side of the insulating underlay elements 1.

The insulating underlay elements 1 are in this case laterally punched insulating underlay elements 1, wherein a protrusion 3 and a receptacle 4 are always arranged alternately, wherein in each case two protrusions 3 enclose a receptacle 4 between one another. It can be seen here that adhesive strips 5 extend behind the protrusions 3 and receptacles 4 as continuous strips on the rear side of the insulating underlay elements 1, wherein the adhesive strip 5 is fastened to the insulating underlay element 1 both on the insulating underlay elements 1 and on the rear side on the protrusions 3.

In the receptacles 4, the adhesive strip 5 thus remains free with an upwardly facing adhesive top side. If an opposing insulating underlay element 1 is now inserted into these receptacles 4 with the aid of the protrusions 3, the protrusions 3 are stuck by way of their undersides to the top side of the adhesive strip 5 and thus connect the insulating underlays disengageably together, thereby reliably ensuring that the insulating underlay elements 1 connected together are held securely.

It should be emphasized here that the shaping of receptacles 4 and protrusions 3 in the present drawings is merely by way of example. Both the angular contour of the protrusions 3 and receptacles 4 and the width and height thereof can vary depending on the embodiment of the invention and are in this case illustrated merely by way of example.

FIG. 2 shows a special embodiment of the insulating underlay elements 1 in the form of folding panels, in the case of which panel-shaped insulating underlay elements 1 are in each case supplied in a manner folded in a concertina-like manner on top of one another and, when the insulating underlays 1 are laid, are unfolded and spread out flat on the floor.

A bending region of such a folding panel is illustrated merely as a detail in FIG. 2, with the adhesive strip 5 according to the invention, which is conjointly folded through 180 degrees in the region of the fold of the panel. As a result, a fold portion 7 exists in the region of this fold, in which the insulating material is compressed by the adhesive strip 5, this not generally being a problem in the case of the foamed plastics used for the insulation.

Alternatively, the backing material of the adhesive strip 5 can exhibit elasticity which allows expansion in this fold region 7 and thus neither prevents the folding of the insulating underlay elements 1 through excessive tension, nor damages the adhesive strip 5 or the insulating underlay at this point.

It is likewise discernible from FIG. 2 that when the individual insulating underlay elements 1 are folded, the receptacles 4 in the push-in connections 2 are arranged opposite one another, with the result that the free regions of the adhesive strips 5 are arranged opposite one another. This state of affairs makes it necessary to ensure that the backing material has sufficient tension to avoid a situation in which the free regions of the adhesive strips 5 within the receptacles 4 come into contact with opposing free portions of the adhesive strips 5. This is ensured by the choice of the PET liner siliconized on one side with a thickness of about 23μ.

This is also clear from the illustration in FIG. 3. In this case, four insulating underlay elements 1 arranged one on top of another are illustrated in a manner folded together. Left-hand and right-hand portions of the protrusions 3 are discernible here and centrally the receptacle 4 in a side view.

The adhesive strips 5 are arranged on the underside in the topmost insulating underlay element 1, for which reason the adhesive surface of the adhesive strip 5' faces upward here. The second insulating underlay element 1 from the top bears against the underside of the adhesive strip 5' located thereabove with the nonadhesive rear side of the adhesive strip 5" facing upward, wherein these are each undersides, resting against one another, of the adhesive strips 5', 5", which cannot stick together. To this end, the adhesive strips are provided on their rear sides with a silicone coating which allows a nonadhesive surface.

The adhesive surface of the adhesive strip 5 in this case faces downward into the receptacle 4 in the case of the adhesive strip 5". The third insulating underlay element 1 from the top is arranged like the first insulating underlay element 1 from the top, namely with an underside adhesive strip 5, the adhesive face of which in the receptacle 4 faces upward. Thus, in this case, the adhesive strips 5" and 5''' are located opposite one another with their adhesive faces by a distance 8 illustrated by an arrow, and so it has to be ensured that in this case the adhesive strips 5 are sufficiently stiff not to sag into the free region of the receptacle 4 and thus come into contact with one another. The bottommost insulating underlay element 1 is again, like the second element from the top, arranged with the adhesive surface of the adhesive strip 5'''' facing downward.

In practice, in the case of the packing unit in the form of folding panels, there are a multiplicity of such arrangements of elements in parallel one above another, which are additionally compressed slightly by a film outer packaging. Therefore, it is fundamentally important for the adhesive surfaces of the adhesive strips 5 in the receptacles 4 to be at a safe distance 8 from one another here.

The illustration in FIG. 3 is illustrated in a simplified manner for clarification, to the extent that the layer thicknesses of the insulating underlay elements 1 are not in the correct relationship to the layer thickness of the adhesive strips 5, which are embodied in a much thinner manner.

The invention claimed is:

1. An insulating underlay element for arranging between a subfloor and walkable floor coverings laid thereon, the insulating underlay element comprising a push-in connection on at least two sides of the insulating underlay element for connecting the insulating underlay elements to form an extensive insulating underlay in a gap-free and extensive manner, wherein, on at least one side of the insulating underlay elements, an adhesive strip is arranged on the underside of the insulating underlay element in a region of the push-in connection, such that the adhesive surface of adhesive strip is arranged in a manner facing upward at least partially in receptacles of the push-in connections and is thus in contact with the undersides of pushed-in protrusions of the push-in connections, the adhesive strip comprising a backing material which is coated with a release adhesive, and the insulating underlay elements being at least partially coated on the underside with a permanent adhesive in the region of the arrangement of the adhesive strips in order to bring about a permanent adhesive connection between the adhesive strips and the underside of the insulating underlay element.

2. The insulating underlay element as claimed in claim 1, wherein the adhesive strip is provided with a release adhesive based on thermoplastic rubber, which is applied to the backing material with a coating weight of 20-50 g per square meter in order to allow a multiple connection to an engaging protrusion of the push-in connection.

3. The insulating underlay element as claimed in claim 1, wherein the insulating underlay elements are coated with the adhesive strips on the rear side in the region of the push-in connection.

4. The insulating underlay element as claimed in claim 1, wherein the insulating underlay element has a thickness ranging from 1 to 5 mm.

5. The insulating underlay element as claimed in claim 1, wherein the backing material of the adhesive strip is a polyester (PET) liner with a thickness of about 23μ.

6. The insulating underlay element as claimed in claim 1, wherein the width of the receptacles of the push-in connections measures about 3 cm and the depth of the receptacles about 1.5 cm, adapted to the elasticity of the backing material of the adhesive strip, in order to ensure that contact between the opposing adhesive-strip regions can be reliably avoided.

7. The insulating underlay element as claimed in claim 1, wherein a hotmelt adhesive based on thermoplastic rubber that is arranged in strips on the underside of the insulating underlay element is used as permanent adhesive for fastening the adhesive strip to the underside of the insulating underlay element.

8. The insulating underlay element as claimed in claim 6, wherein the permanent adhesive is sprayed onto the underside of the insulating underlay element in three strips extending approximately parallel to one another, the total coating weight of these three strips being approximately 0.5 g per meter.

9. A method for producing insulating underlay elements as claimed in claim 1, comprising the method of:
punching out the push-in connections consisting of alternately arranged protrusions and receptacles at least along two parallel longitudinal edges of the insulating underlay elements,
applying a permanent adhesive in strips using an application head for hotmelt adhesive, and
laminating the adhesive strip over the push-in connections and the permanent adhesive applied in this region.

10. The method for producing insulating underlay elements as claimed in claim 9, wherein the permanent adhesive is arranged in a plurality of approximately parallel strips immediately beneath the receptacles parallel to the longitudinal edge of the insulating underlay element.

11. The method for producing insulating underlay elements as claimed in claim 9, wherein the adhesive strip is laminated over the push-in connections by continuously unrolling the adhesive strip from a reel and simultaneously pressing it onto the applied permanent adhesive by means of a pressure roller.

* * * * *